(12) United States Patent
Pinkelman et al.

(10) Patent No.: US 11,084,440 B2
(45) Date of Patent: Aug. 10, 2021

(54) SMART VEHICLE ACCOMMODATION DEVICE ADJUSTMENT

(71) Applicant: Toyota Motor Engineering & Manufacturing North America, Inc., Plano, TX (US)

(72) Inventors: Brian J. Pinkelman, Erlanger, KY (US); Trey Souchock, Erlanger, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/615,796

(22) Filed: Jun. 6, 2017

(65) Prior Publication Data

US 2018/0345889 A1    Dec. 6, 2018

(51) Int. Cl.
| | | |
|---|---|---|
| *B60R 16/037* | (2006.01) | |
| *B60N 2/02* | (2006.01) | |
| *G08C 17/02* | (2006.01) | |
| *G06N 5/02* | (2006.01) | |
| *B60N 2/00* | (2006.01) | |

(52) U.S. Cl.
CPC ............ *B60R 16/037* (2013.01); *B60N 2/002* (2013.01); *B60N 2/0248* (2013.01); *G06N 5/025* (2013.01); *G08C 17/02* (2013.01); *B60N 2002/0272* (2013.01)

(58) Field of Classification Search
None
See application file for complete search history.

(56) References Cited

U.S. PATENT DOCUMENTS

| | | | |
|---|---|---|---|
| 6,718,240 B1 | 4/2004 | Suda | |
| 9,229,905 B1* | 1/2016 | Penilla | G06F 17/00 |
| 2007/0118259 A1 | 5/2007 | Chernoff | |
| 2007/0135982 A1* | 6/2007 | Breed | B60J 10/00 |
| | | | 701/36 |
| 2013/0144470 A1* | 6/2013 | Ricci | H04W 4/90 |
| | | | 701/2 |
| 2014/0265479 A1 | 9/2014 | Bennett | |
| 2015/0046060 A1* | 2/2015 | Nikovski | B60R 16/037 |
| | | | 701/99 |

(Continued)

*Primary Examiner* — Navid Ziaeianmehdizadeh
(74) *Attorney, Agent, or Firm* — Sheppard, Mullin, Richter & Hampton LLP; Hector A. Agdeppa; Daniel N. Yannuzzi

(57) ABSTRACT

Systems and methods are provided for predicting a desired position of or adjustment to one or more accommodation devices of a vehicle, e.g., a seat, a steering wheel, a rearview mirror, etc. A user's position or adjustment preferences may be learned over time by measuring or obtaining data regarding the position or adjustment of accommodation devices. These learned position or adjustment preferences may be stored along with a corresponding day, time of day, and/or vehicle location during or at which the position or adjustment preferences were measured or obtained. During a subsequent occurrence of the day, time of day, and/or if the vehicle is at or traverses a location during which a previous position or adjustment was made, the same or similar position or adjustment can be effectuated. Whether or not the position or adjustment is effectuated can depend on how accurate the predicted position or adjustment may be.

14 Claims, 5 Drawing Sheets

(56) References Cited

U.S. PATENT DOCUMENTS

| | | | |
|---|---|---|---|
| 2015/0197205 A1* | 7/2015 | Xiong | B60R 16/037 |
| | | | 701/49 |
| 2015/0304406 A1* | 10/2015 | Penilla | G01C 21/26 |
| | | | 709/203 |
| 2015/0356797 A1 | 12/2015 | McBride | |
| 2016/0280096 A1 | 9/2016 | Bonk | |
| 2017/0129426 A1* | 5/2017 | Smith | B60R 16/037 |
| 2017/0153636 A1* | 6/2017 | Boesen | B60R 16/037 |
| 2017/0261947 A1* | 9/2017 | Koga | B60R 16/0373 |
| 2017/0282821 A1* | 10/2017 | Zych | B60R 16/037 |

* cited by examiner

SMART VEHICLE ACCOMMODATION DEVICE ADJUSTMENT

TECHNICAL FIELD

The present disclosure relates generally to the adjustment of accommodation devices in vehicles, e.g., the adjustment of seat position. In some embodiments, a preferred seat position can be learned over time, such that seat position can be adjusted automatically.

DESCRIPTION OF RELATED ART

Vehicles include accommodation devices, such as one or more seats, a rearview mirror, sideview mirrors, and the like. Using seats as one example, current vehicles allow a user, e.g., a driver or passenger, to make adjustments to his or her seating position. For example, a seat may have one or more actuators that allow a user to adjust a seat cushion's height or tilt angle, seatback angle or recline level, headrest height, lumbar support, seat bolster support, etc. One or more buttons or levers may be manipulated by the user to initiate movement of the one or more actuators to effectuate such adjustments.

In some vehicles, adjustments may be memorized and recalled. For example, a first user may make desired seat adjustments to his/her seat, mirrors and other accommodation devices. Those settings may be saved as a seat and mirror position profile that is associated with a seat memory button. At some point, the settings of those accommodation devices may change. For example, the first user may make further adjustments to his/her seat position, or a second user that uses the vehicle may adjust the seat and mirrors according to his/her preferences. To return the accommodation devices to his/her preferred, stored positions, the first user may press the seat memory button to recall the accommodation-device position profile. The one or more actuators are enabled to adjust the seat and mirrors in accordance with the stored accommodation position profile. Accommodation-device position profiles may also be stored and uniquely identified for a given vehicle key. In such applications, when the driver unlocks the vehicle using his/her key fob with which the accommodation profile is associated, the seat and mirrors are automatically adjusted accordingly. This recalls the user's defined settings automatically, without the need to press the seat memory button.

BRIEF SUMMARY OF THE DISCLOSURE

In accordance with one embodiment, a method comprises identifying a user of a vehicle, and determining at least one characterization factor impacting a position of one or more accommodation devices. The method further comprises automatically adjusting the position of the one or more accommodation devices of the vehicle based upon historical adjustment data correlated with the user and the at least one characterization factor if a probability threshold that an adjustment to be made to the position of the one or more accommodation devices matches a position adjustment desired by the user is met or exceeded.

In accordance with one aspect, the user of the vehicle can be identified by determining an identifier associated with a remote control device possessed by the user with which the vehicle can be operated. The remote control device may comprise a vehicle key fob. The method may further comprise sensing that the vehicle key fob is proximate to or within the vehicle.

In some aspects, the current location of the vehicle comprises at least one of a portion of a route previously traveled by the vehicle, and a geographic location. In some aspects, the determining of the at least one of the current day, the current time of day, and the current location of the vehicle is performed continuously, periodically, or aperiodically.

In some aspects, the historical adjustment data comprises signal data generated by one or more sensors associated with the one or more accommodation devices, the signal data being indicative of previous adjustments performed by the user on the one or more accommodation devices. In some aspects, the meeting or exceeding of the probability threshold is dependent on a frequency with which the adjusted position is stored as part of the historical adjustment data.

In accordance with another embodiment, a method, comprises obtaining, from one or more sensors, position adjustment data regarding one or more accommodation devices of a vehicle. The method further comprises storing the position adjustment data with characterization factor data occurring during the storage of the position adjustment data occurs. Further still, the method comprises determining a degree of confidence with which the stored position adjustment data is appropriate for a desired position adjustment of the one or more accommodation devices characterized by current characterization factor data that matches that of the stored position adjustment data. Moreover, the method comprises adjusting a position of the one or more accommodation devices upon a determination that the degree of confidence meets or exceeds a confidence threshold.

In some aspects, the method comprises determining an identity of a user of the vehicle, and correlating the position adjustment data with the identity of the user. The one or more accommodation devices may comprise at least one seat of the vehicle.

In some aspects, the querying of the one or more sensors is performed with a frequency dependent upon the at least one of a day, a time of day, and a vehicle location during which the querying of the one or more sensors occurs. The querying of the one or more sensors can be performed with a frequency dependent upon a type of the one or more accommodation devices for which the position adjustment data is obtained. The obtaining of the position adjustment data may comprise at least one of querying the one or more sensors continuously, periodically, or aperiodically, and receiving sensor signals from the one or more sensors continuously, periodically, or aperiodically.

In some aspects, the determining of the degree of confidence comprises determining a number of times that the position adjustment data has been at least one of obtained and stored. In some aspects, the obtaining of the position adjustment data regarding a first of the one or more accommodation devices is dependent upon the obtaining of the position adjustment data regarding a second of the one or more accommodation devices.

In accordance with another embodiment, a system, comprises a processor, and a memory unit operatively connected to the processor. The memory unit may have stored thereon, at least one computer program comprising computer code causing the processor to perform the following: identify a user of a vehicle based upon a key fob possessed by the user sensed as being proximate to or within the vehicle; determine at least one characterization factor impacting one or more positions of a seat in the vehicle; retrieve historical adjustment data corresponding to one or more positions of the seat to be used or being used by the user based upon the identity of the user and the at least one characterization factor; determine a probability that the historical adjustment data will match a user-desired position of the seat; and automatically adjust a position of the seat in accordance with the historical adjustment data correlated with the user and the least one characterization factor upon a determination that the probability that the historical adjustment data will match the user-desired position of the seat meets or exceeds a probability threshold.

In some aspects, the computer code further causes the processor to maintain a current position of the seat or revert to a default position of the seat upon a determination that the probability that the historical adjustment data will match the user-desired position of the seat fails to meet the probability threshold.

In some aspects, the computer code further causes the processor to determine an intermediate level of adjustment to the position of the seat upon a determination that the probability that the historical adjustment data will match the user-desired position of the seat fails to meet the probability threshold.

In some aspects, the at least one characterization factor comprises information indicative of at least one of day, time of day, vehicle speed, vehicle location, and driving style in which the vehicle is driven.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein predict and automatically make adjustments to one or more accommodation devices in accordance with learned adjustment preferences. A user of a vehicle may make one or more adjustments to one or more accommodation devices throughout the course of a day, while traveling one or more routes, etc. Additionally, a vehicle may be operated by more than one user, each user having his/her own preferences regarding the settings of one or more accommodation devices in the vehicle.

Data regarding these adjustments may be collected. For example, signals from sensors associated with one or more actuators used to adjust the one or more accommodation devices may be stored. The signals may indicate the position of the one or more accommodation devices on a particular day, at a particular time of day, and/or at a particular point along a traveled route. The systems and methods disclosed herein can learn that a user prefers one or more accommodation devices to be positioned in a particular configuration on a particular day, at a particular time of day, at a particular point along a traveled route, at a particular vehicle speed, and/or while driving in a particular style (e.g., spirited vs. calm). Thus, over time, the position(s) of one or more accommodation devices can be predicted without (or with less) input from a user as compared to conventional adjustment systems and methods.

In some embodiments, the confidence that a predicted position of an accommodation device will meet the desired preference(s) of a user can be determined. Accordingly, before making an adjustment, the confidence level associated with a predicted adjustment can be compared to a confidence threshold. This can help ensure that a predicted adjustment is carried out only when confidence is high that the predicted adjustment will actually comport with a user's adjustment preferences.

Figure 1A:
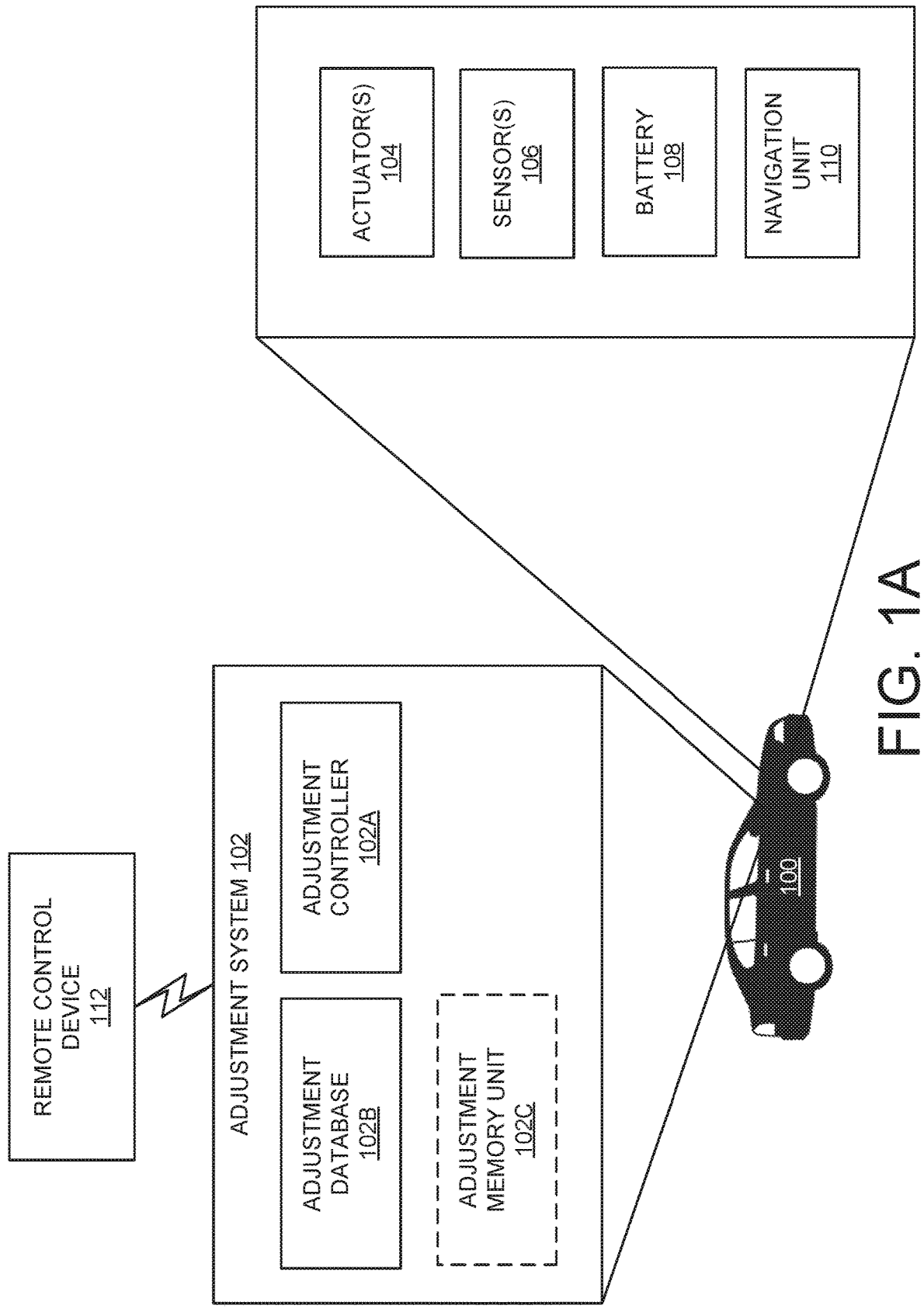
FIG. 1A is a schematic representation of an accommodation device adjustment system in accordance with various embodiments.

FIG. 1A is a schematic representation of an accommodation device adjustment system in accordance with various embodiments illustrated in the context of a vehicle 100. As illustrated, vehicle 100 may include an adjustment system 102. Adjustment system 102 may include an adjustment controller 102A. Adjustment controller 102A may comprise one or more processors or computing components adapted to control the adjustment of one or more accommodation devices of vehicle 100. Adjustment controller 102A may access an adjustment database 102B to retrieve data regarding learned adjustment preferences associated with the one or more accommodation devices of vehicle 100. Based on the learned adjustment preferences, adjustment controller 102A can effectuate adjustments to one or more accommodation devices.

Figure 1B:
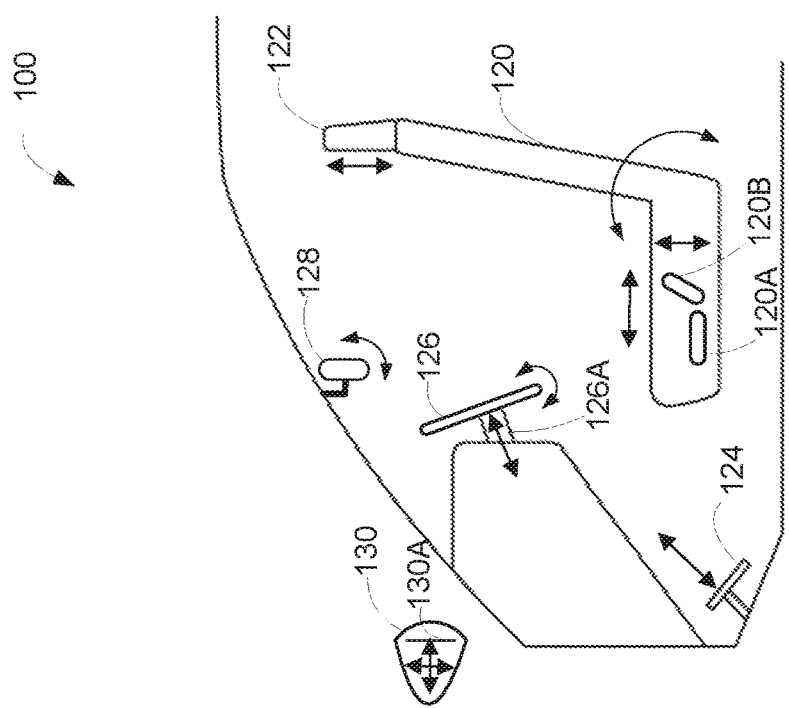
FIG. 1B is a schematic representation of example accommodation devices that can be adjusted by the accommodation adjustment system of FIG. 1A.

FIG. 1B illustrates a side cutaway view of vehicle 100 that reveals a plurality of example accommodation devices that may be present in vehicle 100. As utilized herein, the term "accommodation device" can refer to any device, element, component, or aspect of a vehicle whose position may be adjusted to suit a user. For example, vehicle 100 may include a seat 120. Seat 120 may have a seat cushion or pad and a seat back. Seat 120 may incorporate one or more adjustment buttons or levers, e.g., levers 120A and 120B, that a user may manipulate to effectuate one or more adjustments to seat 120. At the top of seat 120, is a headrest 122 that may also be adjusted. Although not illustrated, lumbar mechanisms, side bolsters, seat heaters and coolers, seat massagers and other comfort devices may also be included as accommodation devices. Other examples of accommodation devices in the example illustrated in FIG. 1B are steering wheel 126 and steering column 126A. Pedals, one example of which may be an acceleration pedal 124, rearview mirror 128, side-view mirror housing 130, and side-view mirror 130A are still other accommodation devices that may be included in vehicle 100.

Example adjustments that can be made to these accommodation devices are represented by the arrows illustrated in FIG. 1B. For example, the seat back of seat 120 may be angled or tilted forwards and backwards to effectuate some level of recline. The seat bottom or cushion of seat 120 may be slid forward and backwards relative to the seat back, moved up and down, and tilted.

As alluded to above, some vehicles may provide the ability for a user to store an adjustment profile. Accordingly, adjustment system 102 may also include an adjustment memory unit 102C (FIG. 1A) that can operate cooperatively with adjustment controller 102A and/or adjustment database 102B. For example, in some embodiments, an adjustment profile(s) stored in adjustment memory unit 102C may characterize a base level or default adjustment profile(s) associated with one or more users of vehicle 100. Adjustment database 102B may store data regarding adjustments to one or more accommodation devices (e.g., data regarding a current position relative to the base level or default adjustment profile(s)). This can be stored, for example, as delta or relative difference data. In this way, the various embodiments described in the present disclosure can be implemented along with conventional vehicles and/or adjustment systems. In some embodiments, adjustment memory unit 102C is not necessary. For example, base level or default adjustment profiles may be stored in and recalled from adjustment database 102B.

Adjustment database 102B may store data regarding the position of one or more accommodation devices. This data may be characterized according to a set of characterization factors such as day of the week, time of day, location or position along a traveled route, vehicle speed, and/or driving style (e.g., spirited vs. calm). The data can be characterized according to other parameters or factors, such as an identifier associated with a remote control device 112 used to operate vehicle 100.

Generally, the adjustment or position of an accommodation device can be described as being a function of a specific user of the accommodation device (which might be identified, e.g., by remote control device associated with a user), a day, a time of day, vehicle location, vehicle speed, and/or driving style. In the case of a seat, for example, the relationship of these factors/parameters can be expressed as follows:

$$\text{Seat position} = f(\text{user}) = f(\text{remote control device, characterization factor})$$

where $f$ can refer to one or more appropriate probabilistic functions or algorithms. In some embodiments, the function $f$ can be weighted, adjusted, and/or normalized. For example, and as described below, the confidence that a predicted adjustment will match a desired position adjustment, can be determined and taken into account. The confidence level associated with a predicted adjustment may be based upon the number of times a particular seat position has been measured on/at a particular day, time of day, and location. The function $f$ may be weighted or adjusted accordingly. It should be noted that although this and other embodiments are described in the context of user identification vis-à-vis a remote control device, such as a key fob, this is merely an option. In some embodiments, other identifiers can be used instead of or in addition to such an identifier.

For example, vehicle 100 may be operated with a remote control device 112, which can be an electronic key fob, a smart phone, or other similar device. More than one remote control device can be associated with vehicle 100. For example, vehicle 100 may be provided with two or more key fobs. Remote control device 112 can be used to automatically open a door to vehicle 100, remotely start the engine of vehicle 100, lock the vehicle, etc. In some embodiments, remote control device 112 can be associated with a particular user of vehicle 100. For example, a first user of vehicle 100 may use a first remote control device while a second user of vehicle 100 may use a second remote control device. Each user may associate his/her adjustment preferences or adjustment profile with his/her remote control device. Upon nearing vehicle 100 or upon opening a door to vehicle 100 using a remote control device 112, the vehicle can identify the remote control device (and thus the user) and the user's adjustment preferences may be retrieved from the database and used to adjust one or more accommodation devices. As long as the remote control device 112 is sensed as being proximate to or "in" vehicle 100, any adjustments that are recorded can be associated with remote control device 112.

With continued reference to FIG. 1A, vehicle 100 may further comprise one or more other elements or components including, but not limited to, one or more actuators 104, one or more sensors 106, a battery 108, and a navigation unit 110. One or more actuators 104 may be used to move or adjust one or more accommodation devices of vehicle 100, such as one or more seats, a rearview mirror, a side-view mirror, etc. The one or more actuators 104 may comprise a brush or a brushless direct current (DC) motor, an induction motor, or other actuator appropriate for adjusting one or more accommodation devices.

The one or more actuators 104 may be controlled by adjustment controller 102A, where adjustment preferences may be obtained or retrieved by adjustment controller 102. The adjustment preferences may then be transmitted to the one or more actuators 104 and used to instruct the one or more actuators as to how and/or to what extent the actuators should move to result in a preferred adjustment or position.

The one or more sensors 106 may sense a position of one or more accommodation devices of vehicle 100. In some embodiments, one or more sensors 106 may sense an absolute position of an accommodation device, or a position relative to a non-adjusted position. In some embodiments, one or more sensors 106 may sense a differential or delta position relative to a base level or default position (e.g., a memorized adjustment preference associated with a user). In some embodiments, one or more sensors 106 may sense the position of an accommodation device based upon directly sensing movement or displacement of the one or more actuators 104, such as, for example, through encoders or other sensing mechanisms.

In some embodiments, one or more sensors 106 may include proximity sensors for sensing the proximity of a remote control device 112 to vehicle 100. In some embodiments, one or more sensors 106 can distinguish between two or more remote control devices proximate to vehicle 100 and can also determine positions, or relative positions, of multiple remote control devices 112. For example, sensors 106 may be configured to determine that a given remote control device may be that being used by a driver of vehicle 100, while a second remote control device may be that being carried by a passenger of vehicle 100. In this way, adjustment preferences can be recognized for both a driver and one or more passengers can be determined and accommodation devices for these seating positions configured accordingly.

Battery 108 may provide electric power to components of vehicle 100, such as the one or more actuators 104. Battery 108 may be a rechargeable battery, such as, for example, a lead-acid battery, a nickel-cadmium battery, a natrium sulphur battery, a lithium rechargeable battery, a hydrogen rechargeable battery or a redox type battery. Battery 108 may also be a photovoltaic array, a mass storage condenser, or other suitable power source. It should be noted that vehicle 100 may have more than one battery, and battery 108 may be used to power other aspects of components of vehicle 100. For example, vehicle 100 may be a hybrid vehicle comprising in part, an electric motor that can be powered by battery 108.

Vehicle 100 may further include a navigation unit 110 that may receive global positioning system (GPS) (or other positioning) information. Navigation unit 110 may include one or more components that receive traffic and/or road information from third-party sources. Based on this information, navigation unit 110 can determine the location or position of vehicle 100, e.g., its position along a particular route or road. Navigation unit 110 may communicate with adjustment controller 102A so that, as described above, information regarding a current location of vehicle 100 can be stored along with adjustment data in adjustment database 102B. Sensors 106 may also include sensors to determine other characterization factors such as vehicle speed sensors, roll pitch and yaw sensors, and so on. In various embodiments, this information can be obtained via navigation unit 110.

Figure 2:
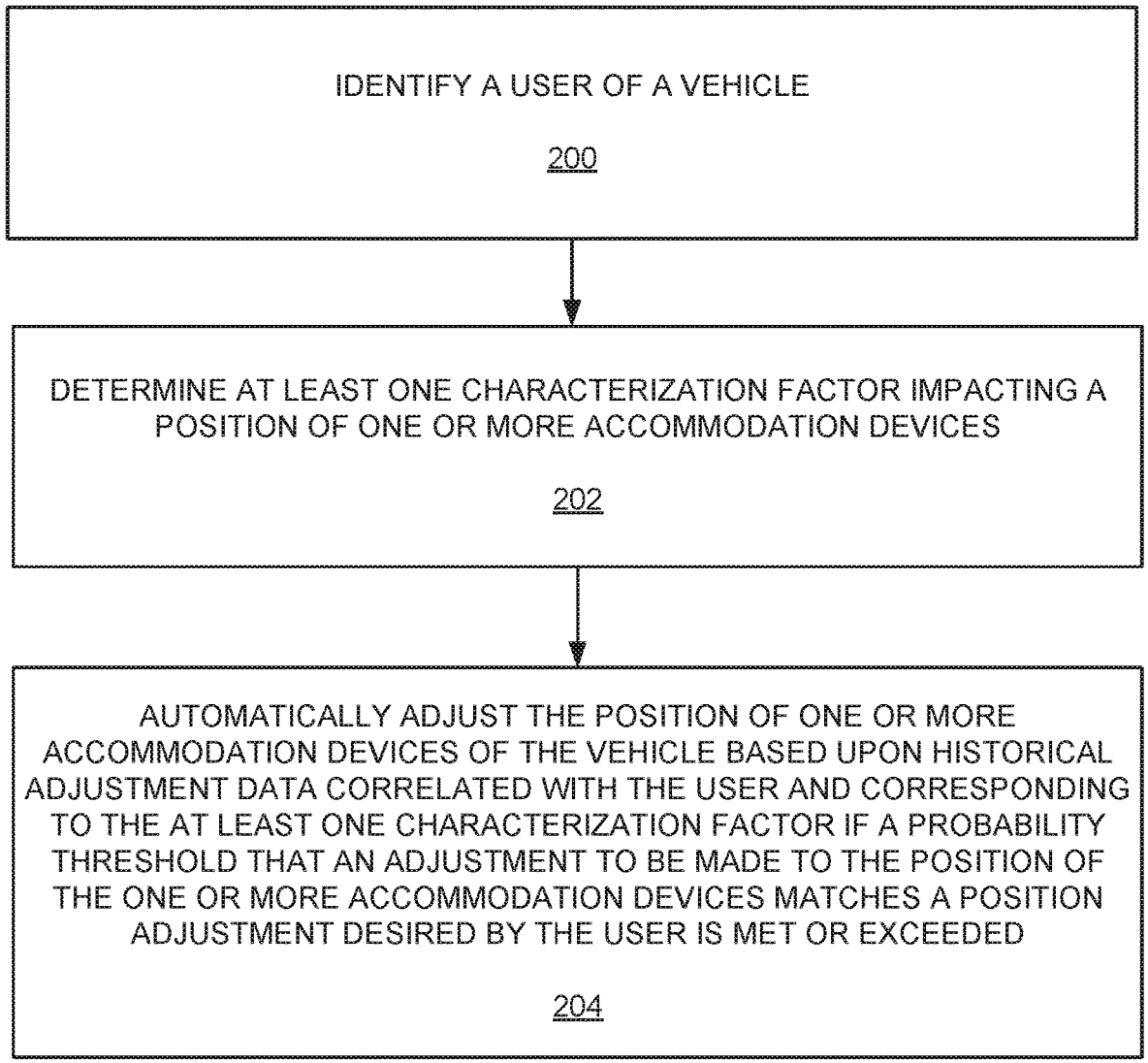
FIG. 2 is a flow chart illustrating example operations that can be performed to automatically adjust the position of one or more accommodation devices in accordance with one embodiment.

FIG. 2 is a flow chart illustrating example operations that may be performed to automatically adjust one or more accommodation devices in a vehicle in accordance with one embodiment. At operation 200, a user of a vehicle is identified. As described above, a user may utilize a remote control device (e.g., remote control device 112 of FIG. 1A) to control one or more aspects of a vehicle. In some embodiments, identification of a user can be performed by sensing that a remote control device is proximate to a vehicle (e.g., vehicle 100 of FIG. 1A). As previously described, a remote control device may have an identifier, such as an identification code with which it is associated. When the remote control device is proximate to a vehicle, it may transmit its identifier to the vehicle. The identifier may be used to obtain an adjustment profile associated with the remote control device from adjustment database 102B and/or adjustment memory unit 102C.

In some embodiments, any preferred adjustments associated with the adjustment profile can be made prior to or upon a user in possession of the remote control device entering the vehicle. In some embodiments, sensing of the remote control device can occur while the remote control device is in the vehicle, e.g., during operation of the vehicle as it is traveling along a route or path.

In some embodiments, a user of a vehicle may input an identifier, such as a code or name that identifies the user to the vehicle upon entry into the vehicle or during its use. In other embodiments, biometric identification techniques can be used to identify the user such as, for example, a fingerprint sensor, voice-recognition, and so on. In a similar manner, the identifier input by the user can be used to retrieve an adjustment profile associated with that user, and one or more adjustments to one or more accommodation devices in the vehicle can be made.

At operation 202, at least one of characterization factor impacting a position of one or more accommodation devices is determined. Based upon this information, at operation 204, a position of one or more accommodation devices of the vehicle is automatically adjusted. The automatic adjustment can be performed based upon historical adjustment data that is correlated with the user, and corresponds to the one or more characterization factors determined. In some embodiments, the automatic adjustment is performed only if a probability threshold that the adjustment to be made to the one or more accommodation devices comports with a position adjustment desired by the user is met or exceeded. In the event that the probability threshold is not met, a current position of the one or more accommodation devices may be maintained. Alternatively, the current position of the one more accommodation devices may be adjusted to revert to a base level or default position. In other embodiments, one or more calculations or determinations may be made to approximate a position. For example, if the probability or confidence threshold is not met, but is close or is at some intermediate level, adjustment component 102A may determine the range(s) within which the historical adjustment data lies, and predict/implement an "average" adjustment.

For example, historical data may suggest that a user's preference may be to position his/her seat (e.g., seat 120 of FIG. 1B) in a more upright position during his/her drive to work. Upon sensing that a remote control device possessed by the user is proximate to the vehicle, adjustment component 102A may identify the user, e.g., by receiving an identifier from the remote control device. The adjustment component 102A may also use the characterization factors to determine that the identified user is about to begin his/her commute to work. For example, the adjustment component 102A may determine that the current day is Monday, the current time of day is 7 AM, and the location of the vehicle is at the user's home. Upon making these determinations, the vehicle can use the historical data to set the accommodation devices in the historical position identified for this day, time and location.

In some embodiments, the system is configured to make the determination and set the accommodation devices when the user is identified without waiting for the vehicle to be started. Accordingly, actuators 104, sensors 106, and navigation unit 110 may be configured to operate on battery power before the vehicle is started. In further embodiments, these components can be configured to be in a sleep mode until the user is identified. In further embodiments, adjustment database 102B, may be implemented as a non-volatile memory. Location may be determined from non-volatile memory associated with navigation unit 110, e.g., adjustment component 102A may determine a last stored or cached location. In some embodiments, navigation unit 110 may be turned on and used to determine a current location.

In some embodiments, adjustment component 102A can access adjustment database 102B while the vehicle is in use, e.g., being driven by the user and/or while the vehicle is on, but in an idle or non-moving state. For example, a user may be driving along a portion of a route where the user has, in the past, adjusted his/her seat to be in a more dynamic driving position due to this portion of the route traversing more twisty roads. Upon determining that the vehicle is traversing this particular portion of the route, it may automatically adjust the user's seat accordingly. In order to effectuate the predicted adjustment, adjustment component 102A can instruct one or more actuators (e.g., one or more actuators 104 of FIG. 1A) to adjust the driver's seat accordingly.

It should be noted that for safety purposes, one or more adjustments to one or more accommodation devices may be delayed until the vehicle comes to a stop or is idling for some period of time. For example, seat adjustments may be prohibited while the vehicle is in motion, whereas rearview and sideview mirror adjustments may be allowed while the vehicle is in motion.

It should also be noted that determining characterization factors can be a continuous, periodic, or aperiodic process. For example, adjustment component 102A may determine time of day and/or location of the vehicle every 5 minutes, every time the vehicle is started, etc. For example, adjustment component 102A may determine a user's identity and/or a current day only upon startup of the vehicle. Many variations of determining such information are contemplated in accordance with various embodiments. In some embodiments, the speed of the vehicle can be used to determine when/how often such determinations are made. For example, when a vehicle is traveling at a higher rate of speed, adjustment component 102A may determine its location every 2 minutes as opposed to every 5 minutes. Alternatively, when the vehicle is traveling at a lower rate of speed, adjustment component 102A may not need to determine the vehicle's location as often. Thus, adjustment component 10A may only query navigation unit 110 regarding the location of the vehicle every 10 minutes.

Figure 3:
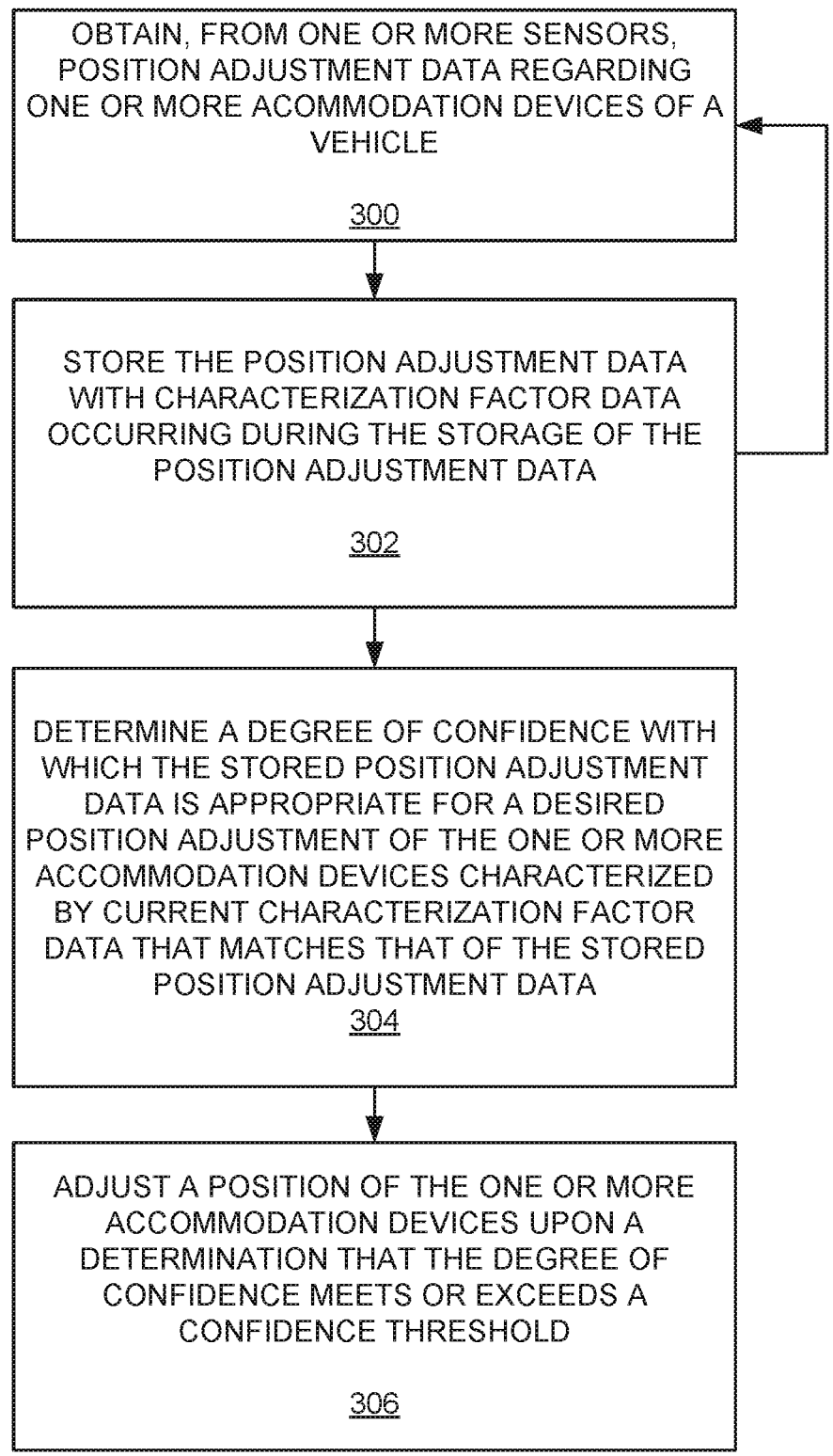
FIG. 3 is a flow chart illustrating example operations that can be performed to learn preferred position adjustments and apply the preferred position adjustments pursuant to meeting or exceeding a confidence threshold in accordance with one embodiment.

FIG. 3 is a flow chart illustrating example operations performed by various embodiments to learn adjustment preferences for use in predicting and effectuating those adjustment preferences. At operation 300, position adjustment data is obtained from one or more sensors (e.g., one or more sensors 106 of FIG. 1A) regarding one or more accommodation devices of a vehicle. In some embodiments, adjustment component 102A may query the one or more sensors. In other embodiments, the one or more sensors may forward or transmit position adjustment data, e.g., as sensor signals, to adjustment component 102A.

As previously discussed, the one or more sensors may monitor the position of an accommodation device and/or one or more actuators (e.g., one or more actuators 104 of FIG. 1A) to determine a current state of the accommodation device. The position adjustment data may be a measurement indicating the amount of actuation of an actuator. In some embodiments, the measurement may be a differential measurement relative to non-actuated state of the actuator. In some embodiments, the position adjustment data may be a measurement of a position of the accommodation device. In some embodiments, the measure may be a differential measurement relative to a base level or default position of the accommodation device.

At operation 302, the position adjustment data may be stored with characterization factor data occurring during the storage of the position adjustment data occurs. It should be noted that characterization factors, e.g., the day, time of day, vehicle speed, vehicle location data, etc. stored with the position adjustment data can that which is determined at the time that the position adjustment data is obtained/measured. In some embodiments, position adjustment data may be stored with certain characterization factors (e.g., day, time of day, and vehicle location data) that are determined prior to the time of storage or measurement. For example, adjustment component 102A may determine day data at the beginning of the day or in accordance with a vehicle clock/timer, where that day data is stored with any subsequently measured position adjustment data within a 24 hour period.

It should be understood that the position adjustment data may be stored as part of a user adjustment profile depending on the identity of the user currently operating or riding in the vehicle. For example, the adjustment profile of a first user identified to be a driver of the vehicle may be associated with position adjustment data for the driver's seat. On the other hand, the adjustment profile of a second user, e.g., a passenger, may be associated with position adjustment data for a passenger seat.

As illustrated in FIG. 3, operations 300 and 302 can be repeated. The frequency with which position adjustment data is obtained and/or stored can vary. For example, the one or more sensors may be queried at faster rate when the vehicle is traveling fast, and at a slower rate when the vehicle is traveling more slowly. That is, a user may make more adjustments in accordance with, e.g., road conditions, when traveling at a faster rate simply because he/she may want to adjust his/her seating position based on road conditions. That is, road conditions leading to seat adjustments can be encountered at a faster rate when the vehicle is traveling more quickly.

The frequency with which position adjustment data is obtained may also be a function of the accommodation device whose position or state of adjustment is being queried. For example, a user may tend to adjust his/her seat more frequently than his/her rearview mirror. Accordingly, adjustment component 102A may query the one or more sensors that are associated with a seat more frequently than one or more sensors associated with a rearview mirror. In some embodiments, obtaining position adjustment data of a first accommodation device can depend on obtaining position adjustment data of a second accommodation device. For example, when adjustment component queries one or more sensors associated with a seat, it may, at the same or substantially the same time, also query one or more sensors associated with a steering wheel or steering column. That is, even small adjustments to a user's seating position may often have an impact on how well that user can access/utilize the steering wheel. In other embodiments, the one or more sensors associated with an accommodation device transmit position adjustment signal data to adjustment component 102A each time the one or more sensors senses that a position adjustment is made.

In order to utilize the learned (i.e., stored) position adjustment data, a degree of confidence with which the stored position adjustment data is appropriate may be determined at operation 304. That is, a determination can be made regarding the probability that a predicted adjustment (based on stored position adjustment data) will match a user's desired position for an accommodation device. As previously noted, the predicted adjustment may be that for which the current characterization factor(s) matches that associated with the stored adjustment data.

Various methods of determining a confidence level can be utilized in accordance with various embodiments. A confidence level can be used so that "over-adjusting" can be avoided and/or to avoid adjustments that have a relatively high chance of being incorrect. For example, a confidence level can be a function of the number of times that a particular seat position has been measured. If a seat position during a particular day, time of day, and/or vehicle location has been measured to be the same or approximately the same 10 times or more, the confidence level may be high. If a seat position has only been measured twice, the confidence level may be low. A coefficient of determination, denoted as $R^2$ is one known method of determining the proportion of variance that can be used to ascertain the confidence level associated with a predicted adjustment. For example, over-time, stored position adjustment data may be analyzed, and if the proportion of variance is small, the coefficient of determination is high, resulting in high confidence. Other methods may be used.

It should be noted that the specification of a confidence threshold at or above which, a predicted adjustment can be effectuated can vary depending on different factors, for example, the accommodation device, the type of vehicle, a vehicle manufacturer's desires, safety considerations, etc. In some embodiments, a confidence threshold of 70% may be sufficient, while in some embodiments, a confidence threshold of 95% may be needed before effectuating an adjustment. Accordingly, at operation 306, a position of the one or more accommodation devices can be adjusted upon a determination that the degree of confidence meets or exceeds a confidence threshold.

It should be noted that for ease of description and clarity of figures, not all contemplated aspects or components of a vehicle have been illustrated. It should be understood, however, that the figures and corresponding descriptions are not meant to be limiting. For example, FIG. 1B illustrates a single car seat 120, but it should be understood that other seats are contemplated, as well as the adjustment thereof. For example, it should be understood that although only two buttons 120A and 120B for providing manual adjustment of seat 120 are illustrated, there may be additional buttons or levers used to make further adjustments to seat 120. Moreover, myriad known and/or future-contemplated adjustments regarding accommodation devices that may not be illustrated or explicitly described, include but are not limited to, e.g., headrest tilt, headrest side support adjustment, lumbar support, massage intensity/location, cushion length, seat side/bolster support, and the like.

Figure 4:
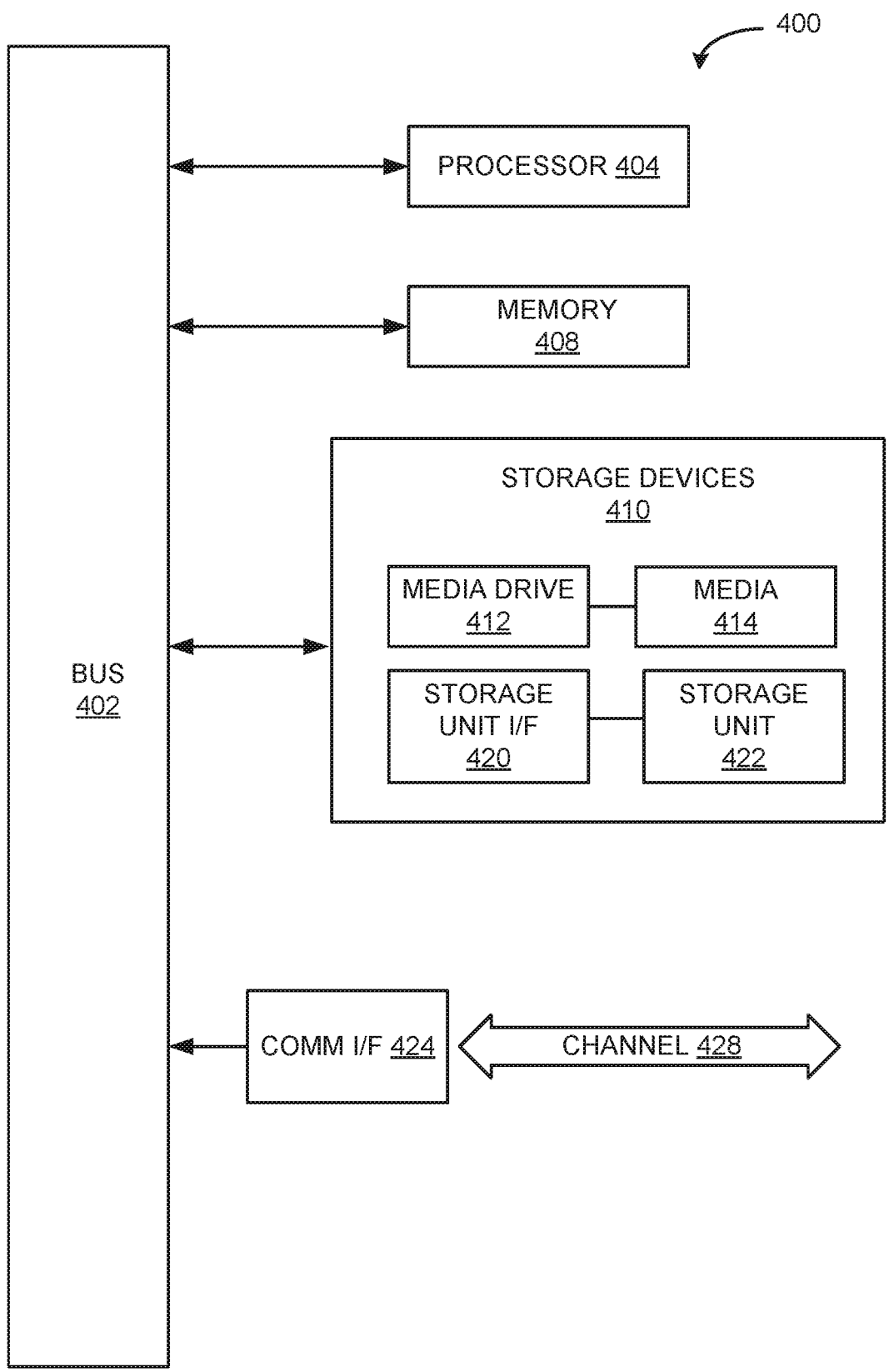
FIG. 4 is an example computing component that may be used to implement various features of embodiments described in the present disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 4. Various embodiments are described in terms of this example-computing component 400. After reading this description, it will become apparent to a person skilled in the relevant art how to implement the application using other computing components or architectures.

Referring now to FIG. 4, computing component 400 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 400 might also represent computing capabilities embedded within or otherwise available to a given device. For example, a computing component might be found in other electronic devices such as, for example, portable computing devices, and other electronic devices that might include some form of processing capability.

Computing component 400 might include, for example, one or more processors, controllers, control components, or other processing devices. This can include a processor, and/or any one or more of the components making up remote control device 112, adjustment system 102 and its component parts, and/or any other components or elements of vehicle, e.g., actuator(s) 104, navigation unit 110, etc. Processor 404 might be implemented using a general-purpose or special-purpose processing engine such as, for example, a microprocessor, controller, or other control logic. Processor 404 may be connected to a bus 402. However, any communication medium can be used to facilitate interaction with other components of computing component 400 or to communicate externally.

Computing component 400 might also include one or more memory components, simply referred to herein as main memory 408. For example, random access memory (RAM) or other dynamic memory, might be used for storing information and instructions to be executed by processor 404. Main memory 408 might also be used for storing temporary variables or other intermediate information during execution of instructions to be executed by processor 404. Computing component 400 might likewise include a read only memory ("ROM") or other static storage device coupled to bus 402 for storing static information and instructions for processor 404.

The computing component 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a solid state drive, a magnetic tape drive, an optical drive, a compact disc (CD) or digital video disc (DVD) drive (R or RW), or other removable or fixed media drive might be provided. Storage media 414 might include, for example, a hard disk, an integrated circuit assembly, magnetic tape, cartridge, optical disk, a CD or DVD. Storage media 414 may be any other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing component 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory component) and memory slot. Other examples may include a PCMCIA slot and card, and other fixed or removable storage units 422 and interfaces 420 that allow software and data to be transferred from storage unit 422 to computing component 400.

Computing component 400 might also include a communications interface 424. Communications interface 424 might be used to allow software and data to be transferred between computing component 400 and external devices. Examples of communications interface 424 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 424 may be carried on signals, which can be electronic, electromagnetic (which includes optical) or other signals capable of being exchanged by a given communications interface 424. These signals might be provided to communications interface 424 via a channel 428. Channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 400 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:

identifying a user of a vehicle by determining an identifier associated with a vehicle key fob possessed by the user with which the vehicle can be remotely operated;

determining at least one characterization factor impacting a position of one or more accommodation devices, wherein determining the characterization factor utilizes a current location of the vehicle obtained by a navigation unit of the vehicle in an aperiodic process or a periodic process, the aperiodic process and the periodic process having a frequency that is based on a rate of speed of the vehicle such that in response to the vehicle traveling at an increased rate of speed the frequency of obtaining the location of the vehicle from the navigation unit is increased and the frequency of determining the characterization factor is increased;

upon sensing that the vehicle key fob is within communication range of the vehicle or sensing that the vehicle key fob has been used to remotely operate the vehicle and if the adjustment to be made to the one or more accommodation devices meets or exceeds a probability threshold for matching a position adjustment desired by the user, automatically adjusting the position of the one or more accommodation devices of the vehicle based upon historical adjustment data comprising at least signal data generated by one or more sensors associated with the one or more accommodation devices, the signal data representing previous adjustments performed by the identified user associated with the vehicle key fob on the one or more accommodation devices being stored such that the historical adjustment data is correlated with the identified user associated with the vehicle key fob and the at least one characterization factor; and upon sensing that the vehicle key fob is within communication range of the vehicle or sensing that the vehicle key fob has been used to remotely operate the vehicle and if the adjustment to be made to the one or more accommodation devices does not meet or exceed the probability threshold, determining a range of the historical adjustment data that is corelated with the identified user associated with the key fob and includes the adjustment to be made to predict an average adjustment using the range of the historical adjustment data.

2. The method of claim 1, wherein a current location of the vehicle comprises at least one of a portion of a route previously traveled by the vehicle, and a geographic location.

3. The method of claim 1, wherein the determining of the at least one of a current day, a current time of day, and a current location of the vehicle is performed continuously, periodically, or aperiodically.

4. The method of claim 1, comprising:
automatically adjusting the position of the one or more accommodation devices of the vehicle based upon the predicted average adjustment.

5. A method, comprising:
identifying a user of a vehicle by determining an identifier associated with a vehicle key fob possessed by the user with which the vehicle can be remotely operated;
obtaining, from one or more sensors, position adjustment data regarding one or more accommodation devices of a vehicle, wherein the obtaining of the position adjustment data comprises at least one of querying the one or more sensors continuously, periodically, or aperiodically, and receiving sensor signals from the one or more sensors continuously, periodically, or aperiodically indicative of previous adjustments performed by the user on the one or more accommodation devices;
determining a degree of confidence with which the position adjustment data is appropriate for a desired position adjustment of the one or more accommodation devices characterized by a determined characterization factor data, wherein the characterization factor is determined utilizing a current location of the vehicle obtained by a navigation unit of the vehicle in an aperiodic process or a periodic process, the aperiodic process and the periodic process having a frequency that is based on a rate of speed of the vehicle such that in response to the vehicle traveling at an increased rate of speed the frequency of obtaining the location of the vehicle from the navigation unit is increased and the frequency of determining the characterization factor is increased
upon sensing that the vehicle key fob is within communication range of the vehicle or sensing that the vehicle key fob has been used to remotely operate the vehicle and that the degree of confidence meets or exceeds a confidence threshold, automatically adjusting a position of the one or more accommodation devices; and
upon sensing that the vehicle key fob is within communication range of the vehicle or sensing that the vehicle key fob has been used to remotely operate the vehicle and that the degree of confidence does not meet or exceed a confidence threshold, determining a range of position adjustment data that is correlated with the identified user associated with the vehicle key fob and includes the adjustment to be made to predict an average adjustment using the range of adjustment data,
automatically adjusting the position of the one or more accommodation devices of the vehicle based upon the predicted average adjustment.

6. The method of claim 5, further comprising correlating the position adjustment data with the determined identifier.

7. The method of claim 5, wherein the one or more accommodation devices comprises at least one seat of the vehicle.

8. The method of claim 5, wherein a querying of the one or more sensors is performed with a frequency dependent upon the at least one of a day, a time of day, and a vehicle location during which the querying of the one or more sensors occurs.

9. The method of claim 5, wherein a querying of the one or more sensors is performed with a frequency dependent upon a type of the one or more accommodation devices for which the position adjustment data is obtained.

10. The method of claim 5, wherein the obtaining of the position adjustment data regarding a first of the one or more accommodation devices is dependent upon the obtaining of the position adjustment data regarding a second of the one or more accommodation devices.

11. A system, comprising:
a processor; and
a memory unit operatively connected to the processor, the memory unit having stored thereon, at least one computer program comprising computer code causing the processor to perform the following:
identify a user of a vehicle based upon a key fob possessed by the user sensed as being within communication range of or within the vehicle;
determine at least one characterization factor impacting one or more positions of a seat in the vehicle, wherein determining the at least one characterization factor utilizes a current location of the vehicle obtained by a navigation unit of the vehicle in an aperiodic process or a periodic process, the aperiodic process and the periodic process having a frequency that is based on a rate of speed of the vehicle such that in response to the vehicle traveling at an increased rate of speed the frequency of obtaining the location of the vehicle from the navigation unit is increased and the frequency of determining the at least one characterization factor is increased;
retrieve historical adjustment data corresponding to one or more positions of the seat to be used or being used by the identified user associated with the key fob;
determine a probability that the historical adjustment data will match a user-desired position of the seat;
upon sensing that the vehicle key fob is within communication range of the vehicle or sensing that the vehicle key fob has been used to remotely operate the vehicle and if the probability that the historical adjustment data matches the user-desired position of the seat meets or exceeds a probability threshold, automatically adjust a position of the seat in accordance with the historical adjustment data correlated with the identified user associated with the key fob and the least one characterization factor; and
upon sensing that the vehicle key fob is within communication range of the vehicle or sensing that the vehicle key fob has been used to remotely operate the vehicle and if the probability that the historical adjustment data matches the user-desired position of the seat does not meet or exceed a probability threshold, determining a range of the historical adjustment data that is correlated with the identified user associated with the key fob and includes the adjustment to be made to predict an average adjustment using the range of the historical adjustment data, and
automatically adjusting the position of the seat based upon the predicted average adjustment and the range of the historical adjustment data.

12. The system of claim 11, wherein the computer code further causes the processor to maintain a current position of the seat or revert to a default position of the seat upon a determination that the probability that the historical adjustment data will match the user-desired position of the seat fails to meet the probability threshold.

13. The system of claim 11, wherein the computer code further causes the processor to determine an intermediate level of adjustment to the position of the seat upon a determination that the probability that the historical adjustment data will match the user-desired position of the seat fails to meet the probability threshold.

14. The system of claim 11, wherein the at least one characterization factor comprises information indicative of at least one of a day, a time of day, a vehicle speed, a vehicle location, and a driving style in which the vehicle is driven.

* * * * *